March 17, 1936. W. R. BROWN 2,034,326
TEMPLE CONNECTION FOR SPECTACLES
Filed Jan. 25, 1932 2 Sheets-Sheet 1
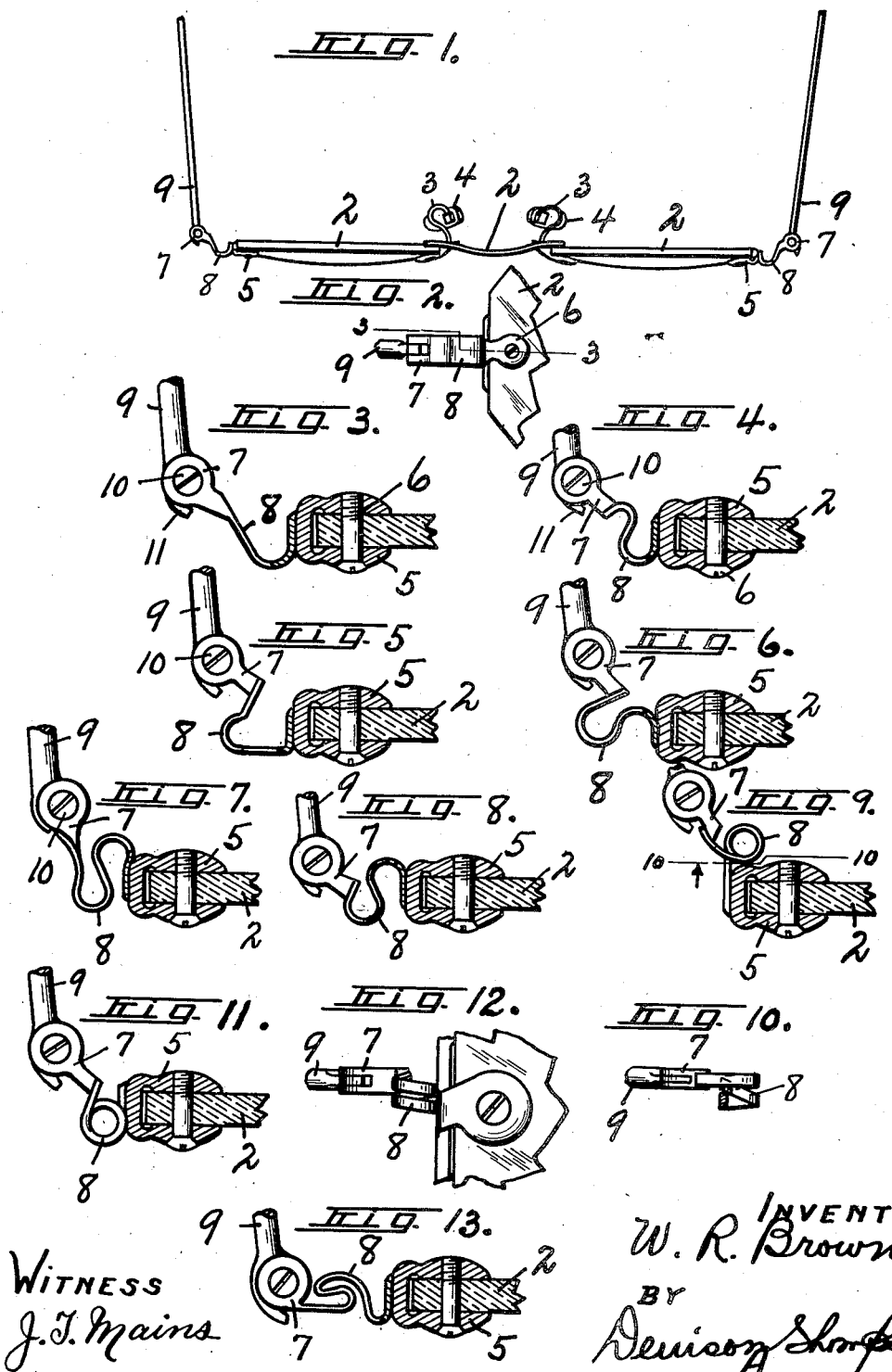

March 17, 1936. W. R. BROWN 2,034,326
TEMPLE CONNECTION FOR SPECTACLES
Filed Jan. 25, 1932 2 Sheets-Sheet 2
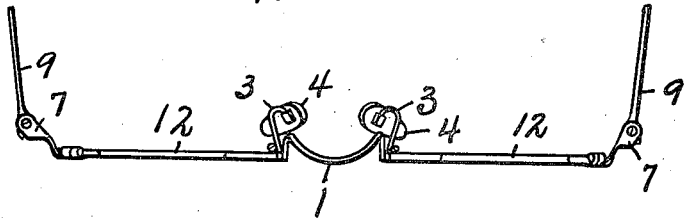
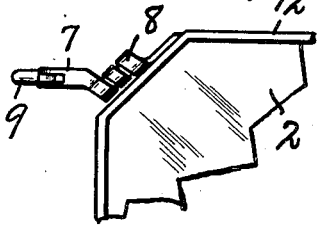
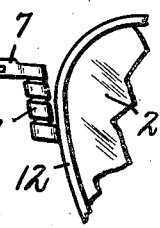
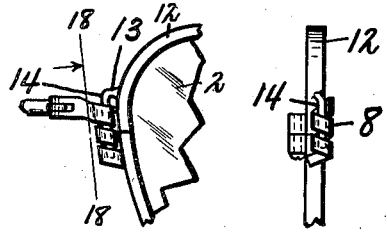
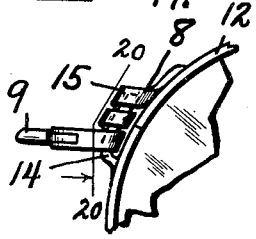
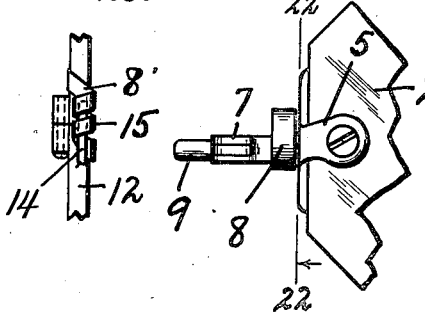
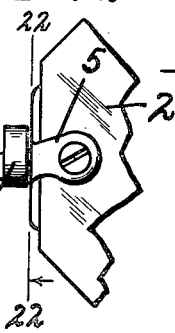
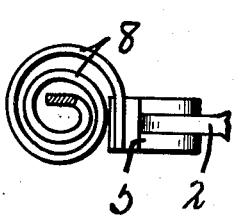
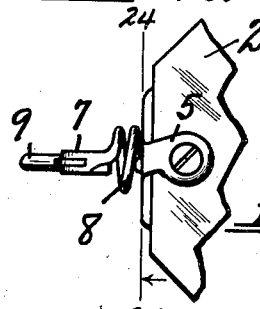
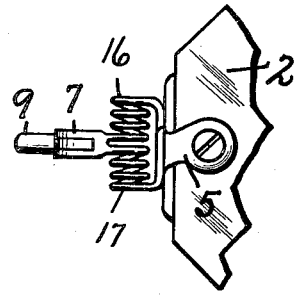

Patented Mar. 17, 1936

2,034,326

UNITED STATES PATENT OFFICE 2,034,326

TEMPLE CONNECTION FOR SPECTACLES

William R. Brown, Monroe, La., assignor to Shuron Optical Company, Inc., Geneva, N. Y., a corporation of New York Application January 25, 1932, Serial No. 588,647

3 Claims. (Cl. 88—53)

This invention relates to certain new and useful improvements in temple connections for spectacles.

The main object of the invention is the production of a more efficient, desirable and permanent spectacle wherein ready movement of the end-pieces to which the temples are pivotally connected is permitted with respect to the lenses and the face of the wearer through the medium of a resilient connection which also tends to eliminate breaking of the lenses at their points of connection to the outer lens clamps.

More specifically, when a pair of spectacles are removed from the face of the wearer, at least one temple has to be removed from behind the ear before the nose-bearing or bridge portion is disengaged.

To accomplish this, one or both temples are raised and generally bent out laterally as well. This is possible due generally to some flexible part of the temple, but nevertheless such treatment in taking glasses off and putting them on is apt to throw the temple out of adjustment and also throw some strain on the front which, of course, consists of the bridge, end-pieces, lenses and eye-wires or clamps and tends to throw it out of adjustment, or in the case of rimless spectacles puts a strain on the lenses which may cause them to break.

In general, the purpose of the flexible end-piece connection to the lens-support is to relieve the strain caused by taking spectacles off and putting them on, or by the inaccuracies of fitting the frame or mounting and does prevent distortion of the frame or breakage of the lenses.

Other objects and advantages relate to the details of the various constructions and the form and relation of the parts thereof, all as will more readily appear from the following description, taken in connection with the accompanying drawings in which:—

Figure 1 is a top plan view of a spectacle of this invention.

Figure 2 is a front elevation of a portion of the lens, lens clamp, end piece and temple of Figure 1.

Figure 3 is a section taken on line 3—3, Figure 2.

Figures 4 to 9 inclusive illustrate modified forms of the invention taken on lines similar to Figure 3.

Figure 10 is a section on the line 10—10, Figure 9.

Figure 11 is a view similar to Figure 3 of a further modified form of the invention.

Figure 12 is a view similar to Figure 2 of the structure illustrated in Figure 11.

Figure 13 is a view similar to Figure 3 of a further modified form of the invention.

Figure 14 is a top plan view of another modified form of the invention.

Figure 15 is an enlarged view of lens, lens frame, resilient element, end piece and temple, as shown in Figure 14, with one end of the resilient element connected directly to the lens frame.

Figures 16 and 17 are views similar to Figure 15, of further modified forms of the invention.

Figure 18 is a section taken on line 18—18, Figure 17.

Figure 19 is a view similar to Figure 15 of a further modified form of the invention.

Figure 20 is a section taken on line 20—20, Figure 19.

Figure 21 is a view similar to Figure 15 of a further modified form of the invention.

Figure 22 is a section taken on line 22—22, Figure 21.

Figure 23 is a view similar to Figure 15, of a further modified form of the invention illustrated in connection with a rimless construction.

Figure 24 is a section taken on line 24—24, Figure 23.

Figures 25 and 26 are views similar to Figure 15 of other modifications that the invention may take.

The embodiment of the invention shown in Figures 1 to 3 inclusive, comprises a bridge 1 secured to lenses 2 as by means of usual lens clamps or by means of such a construction as that illustrated in Letters-Patent of the United States, No. 1,836,642, dated December 15, 1931 issued upon an application filed by me.

The bridge 1 carries the usual nose pad supports 3 upon which nose pads 4 are mounted in any usual manner. The particular construction of the parts so far identified, does not constitute an essential feature of this invention.

With a rimless construction such as that shown in the figures referred to, lens clamps 5 are secured to the outer edges of the lenses in any suitable manner as by a screw 6. In the usual construction of spectacle, end pieces are rigidly carried by or formed integrally with these lens clamps 6. The essential feature of this invention resides in a construction in which the end pieces 7, instead of being rigidly secured to the lens clamps 6, are connected to the lens clamps by means of an intermediate resilient connecting strip or member 8 which may assume various forms. These resilient connecting members may be formed of any suitable material, but for the purpose of illustration, they may effectively be formed of gold so tempered as to have practically no ductility but a high degree of elasticity or resiliency.

The temples 9 may, in the usual manner, be pivotally connected to the end pieces 7 by means of screw studs 10, the end pieces being provided with stop shoulders against which the lugs 11 on the temples abut to limit relative movement in one direction in the usual manner. The resilient connecting members 8 have one end connected to the lens clamp 6 in any suitable manner as by soldering, and the opposite end connected to the end piece 7 also in any desirable manner as by soldering, welding or the like.

As suggested, the essential feature of this invention resides in the provision of a non-ductile elastic or resilient connecting member 8 having one end secured to the lens clamp 6 or other lens frame, as hereinafter described, and its opposite end connected to the end piece 7 whereby limited relative movement in various and substantially universal directions is permitted between the end piece 7 and the lens clamp 6 and the lens to which said clamp is secured. With this arrangement, the temple 9 not only has a pivotal movement with respect to the end piece 7, but is capable of moving the end piece 7 with respect to the lens clamp 6 in substantially all directions by reason of the elasticity or resiliency of the connecting member 8 permitting automatic adjustment of the temples 9 as may be required by various facial contours and eliminating, to a great extent, the danger of breaking the lens 2 at its point of connection to the lens clamp 6.

As shown, the resilient connecting member 8 constitutes the sole support for the end pieces from the lens clamps or frames and is the sole connection between them and as suggested, may assume various forms and may provide a connection of varying resiliency, but is of such a non-ductile nature, as to normally maintain the end pieces in a predetermined position with respect to the lens clamps and so as to return the end pieces to such normal position after any deflection or movement thereof with relation to the lens clamps.

Figures 4 to 13 illustrate various modifications of the shape and form of the resilient connecting member 8. Preferably as illustrated in all of the figures, the resilient connecting member 8 is provided with an intermediate offset or bent portion which adds to its effectiveness and resiliency or elasticity.

In Figure 4, the member 8 is provided with a reverse bend and the same is true in Figures 5, 7, 8 and 13, these reverse bends taking various forms.

Figure 5 illustrates a somewhat different shape of connecting member 8 than is shown in Figure 3, permitting a closer disposition of the end piece to the lens clamp without shortening the length of the resilient element 8.

Figures 9, 10, 11 and 12 illustrate a resilient connecting member 8 having its intermediate portion formed in a coil which may be of any member of convolutions, two such convolutions being illustrated in each case, but disposed somewhat differently with respect to the lens clamp.

Figure 14 illustrates a spectacle in which the lenses are confined in framing and as with such a construction the lens clamps are omitted, one end of the resilient connecting member 8 may be connected directly to the frame 12 and its opposite end is connected to the end piece 7. As illustrated in Figures 14 and 15, the resilient connecting member 8 is formed in a series of coils or convolutions, three being there shown, with one end of member 8 connected to the lens frame 12 near its upper portion and the opposite end extending outwardly and connected to the end piece 7 which, in the manner illustrated in the previous figures, has a pivotal mounting for the temple 9.

Figure 16 illustrates a modified form of this arrangement in which the lower end of the resilient member 8 is connected to the lens frame 12 and the coils or convolutions formed in the intermediate portion of the member 8 have a substantially vertical axis, the upper end of the member 8 being connected to the end piece 7.

Figures 17 and 18 illustrate a construction similar to Figure 16 except that the frame 12 is provided with an annular lug having one end 13 connected to the frame 12 in any suitable manner as by soldering, and its other leg 14 extending downwardly into the convolutions or coils of the resilient member 8 to form a sort of bearing for the coils and acting somewhat to restrain the coils in their various possible movements.

Figures 19 and 20 illustrate a construction similar to Figures 17 and 18 respectively, except that the leg 14 projects upwardly in a somewhat inclined manner into and through the convolutions 15 of the resilient member 8.

Figures 21 and 22 illustrate a further modified form in which the intermediate portion of member 8 is formed in a coil with substantially concentric convolutions about a horizontal axis, one end of the member being connected in this case, to a lens clamp 6, because of the rimless construction, and the other end of the member 8 being connected to the end piece 7.

Figures 23 and 24 illustrate a construction similar to Figures 21 and 22 except that the resilient member 8 is illustrated as in the form of a wire coiled about a horizontal axis but in which the coils are not arranged one within the other, but rather in the form of a helix.

Figures 25 and 26 illustrate similar constructions but in which the resilient member 8 may consist of two coils 16 and 17, each having one end connected to the lens clamp 6 and having their opposite ends connected to the end piece 7. The end piece is, as shown, preferably connected to the ends of the coils adjacent each other so that the end piece lies substantially centrally with respect to the coils. It is possible that these two coils may be formed of a single wire which has its intermediate portion connected to the lens clamp 6 and its opposite ends coiled toward each other about a substantially vertical axis and with the end piece connected to the inner adjacent ends of the two two coils.

It will be apparent from the above that with each of the embodiments of the invention illustrated, the end piece is resiliently connected to the lens supporting member whether it be a frame member or a lens clamp, and that due to its resiliency, the connecting member 8 normally maintains the end piece and the temple carried thereby in a predetermined position with respect to the lens, but permits substantially universal limited movement of the end piece with respect to the lens. This permits automatic adjustment of the temple to meet the requirements of various facial contours and other conditions, and due to its resiliency, tends to obviate breaking of the lens at the lens clamp, and although I have shown and described various embodiments of the invention as illustrative thereof, I do not desire to restrict myself to the details of construction, form or arrangement, as various changes and modifications may be made within the scope of the appended claims.

I claim:

1. A spectacle comprising a bridge, lenses secured to the opposite sides of the bridge, lens-securing members having portions bearing upon the rims of the lenses, end pieces, temples pivotally mounted upon the end pieces, and resilient elements each having one end connected to a lens-securing member and the other end connected to an end piece and constituting the sole support for the latter from the former, said resilient elements being so constructed as to permit substantially universal movement of the temples with respect to the lenses.

2. A spectacle comprising a bridge, a lens secured with respect to the bridge, a lens clamp having a shoe bearing upon the rim of the lens, an end piece, a temple pivotally secured to the end piece, and a resilient element provided with an intermediate bent portion having one end secured to the lens clamp and its other end secured to the end piece and constituting the sole support for the latter from the former.

3. A spectacle comprising a bridge, a lens secured with respect to the bridge, a lens clamp having a shoe bearing upon the rim of the lens, an end piece, a temple pivotally secured to the end piece, and a resilient element provided with an intermediate coil portion having one end secured to the lens clamp and its other end secured to the end piece and constituting the sole support for the latter from the former.

WILLIAM R. BROWN.